Dec. 22, 1936.    A. J. EWENS    2,065,437
MOTOR VEHICLE
Filed Sept. 14, 1935    3 Sheets-Sheet 1

Inventor
Alfred J. Ewens
By Miller & Miller
Attorneys

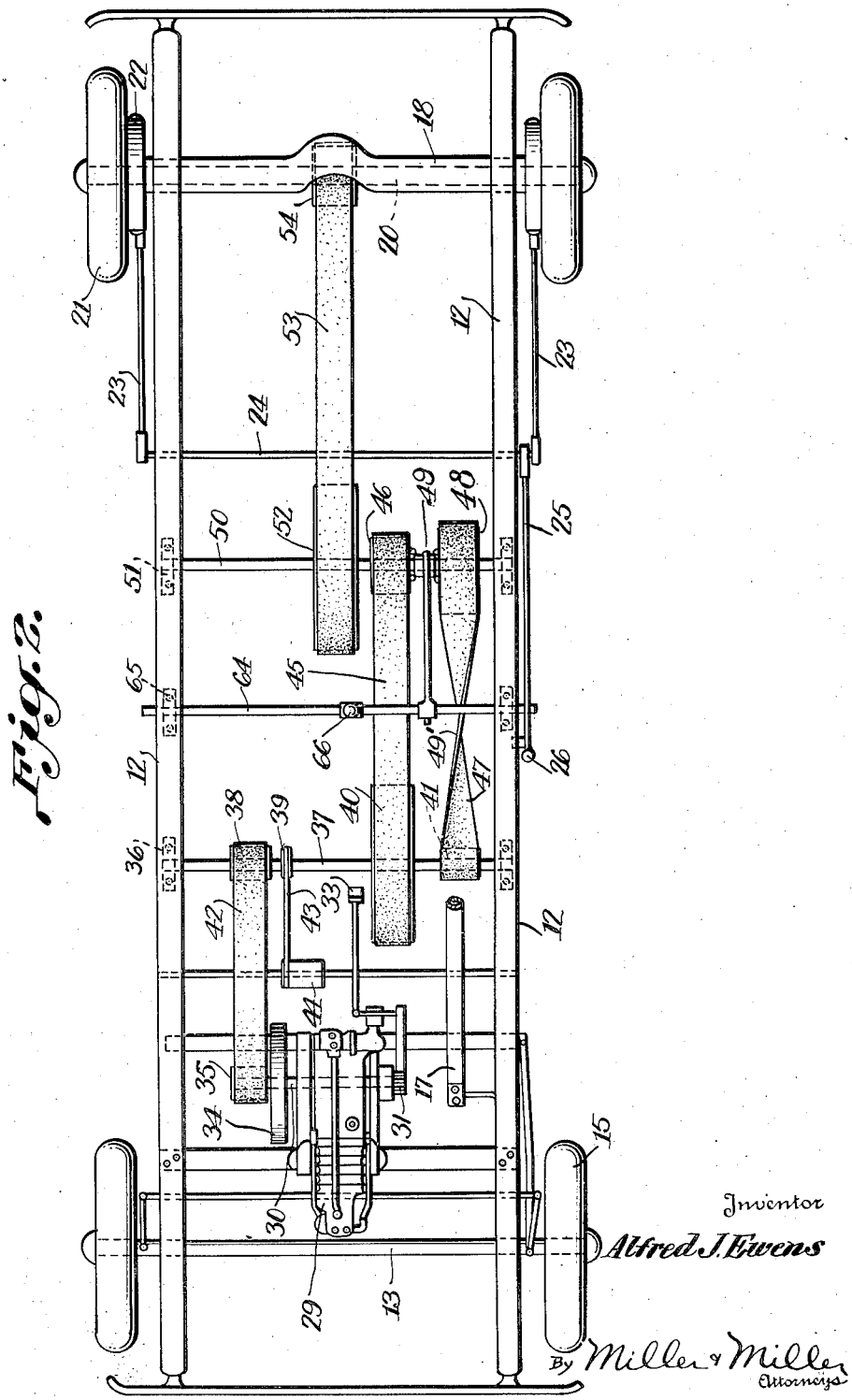

Dec. 22, 1936.                A. J. EWENS                2,065,437
                              MOTOR VEHICLE
                         Filed Sept. 14, 1935          3 Sheets-Sheet 3
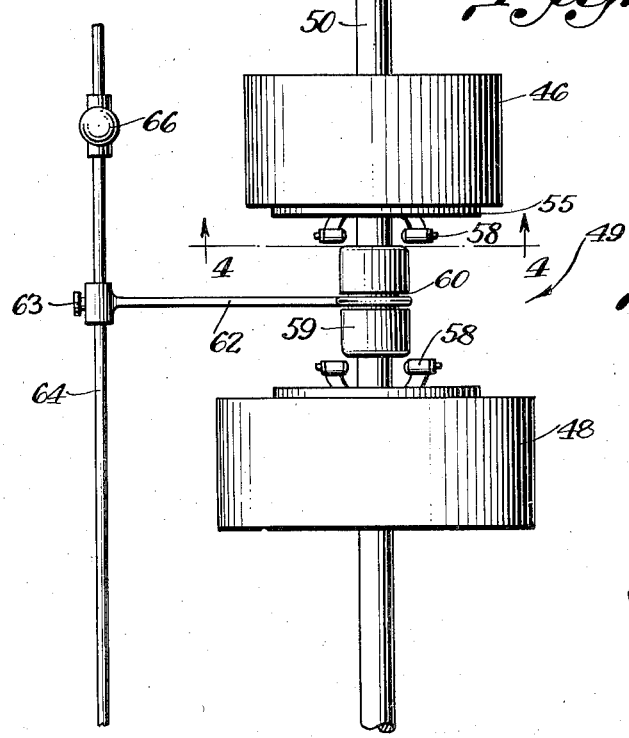
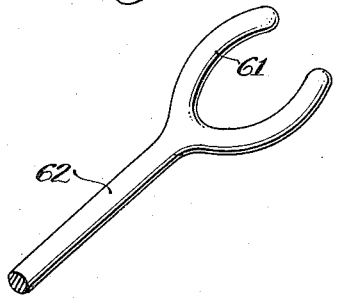
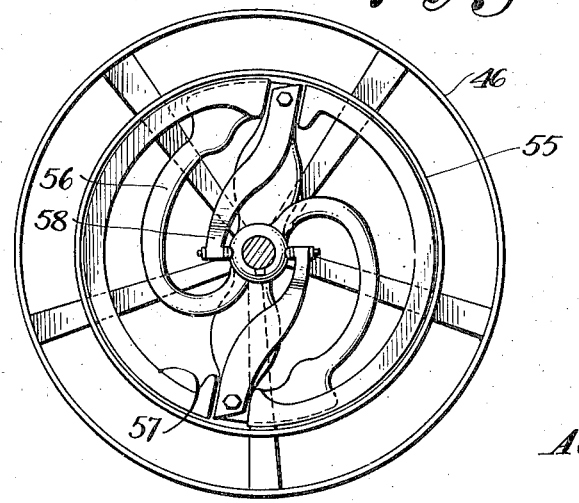
Inventor
Alfred J. Ewens
By Miller & Miller
Attorneys Patented Dec. 22, 1936

2,065,437

UNITED STATES PATENT OFFICE 2,065,437

MOTOR VEHICLE

Alfred J. Ewens, Kenosha, Wis.

Application September 14, 1935, Serial No. 40,650

3 Claims. (Cl. 180—72)

This invention relates to a motor vehicle and has for an object to provide an improved low-power, high-speed vehicle which is economical to construct and economical to operate.

An important feature of this invention is the great economy of fuel in operation as well as the speed that may be developed, the low-power motor utilized being preferably a ¾ to a 3 horsepower air-cooled gasoline motor.

A further feature of this invention is the utilization of pulley and endless belts for transmitting the power from the motor to the rear wheels and at the same time stepping up the speed of rotation of the rear wheels in relation to the speed of operation of the motor. The utilization of the belt as power transmission provides a greater flexibility of driving.

With the foregoing and other objects in view, as will hereinafter become apparent, this invention comprises the constructions, combinations, and arrangements of parts, hereinafter set forth, claimed and shown on the accompanying drawings. In these drawings, Figure 1 is a side elevational view of the motor vehicle of this invention.

Figure 2 is a diagrammatic plan view of the same.

Figure 3 is an enlarged plan view of the clutch and associated mechanism.

Figure 4 is a sectional view on line 4—4 of Figure 3, and

Figure 5 is a perspective view of the clutch operating fork.

Figure 1:
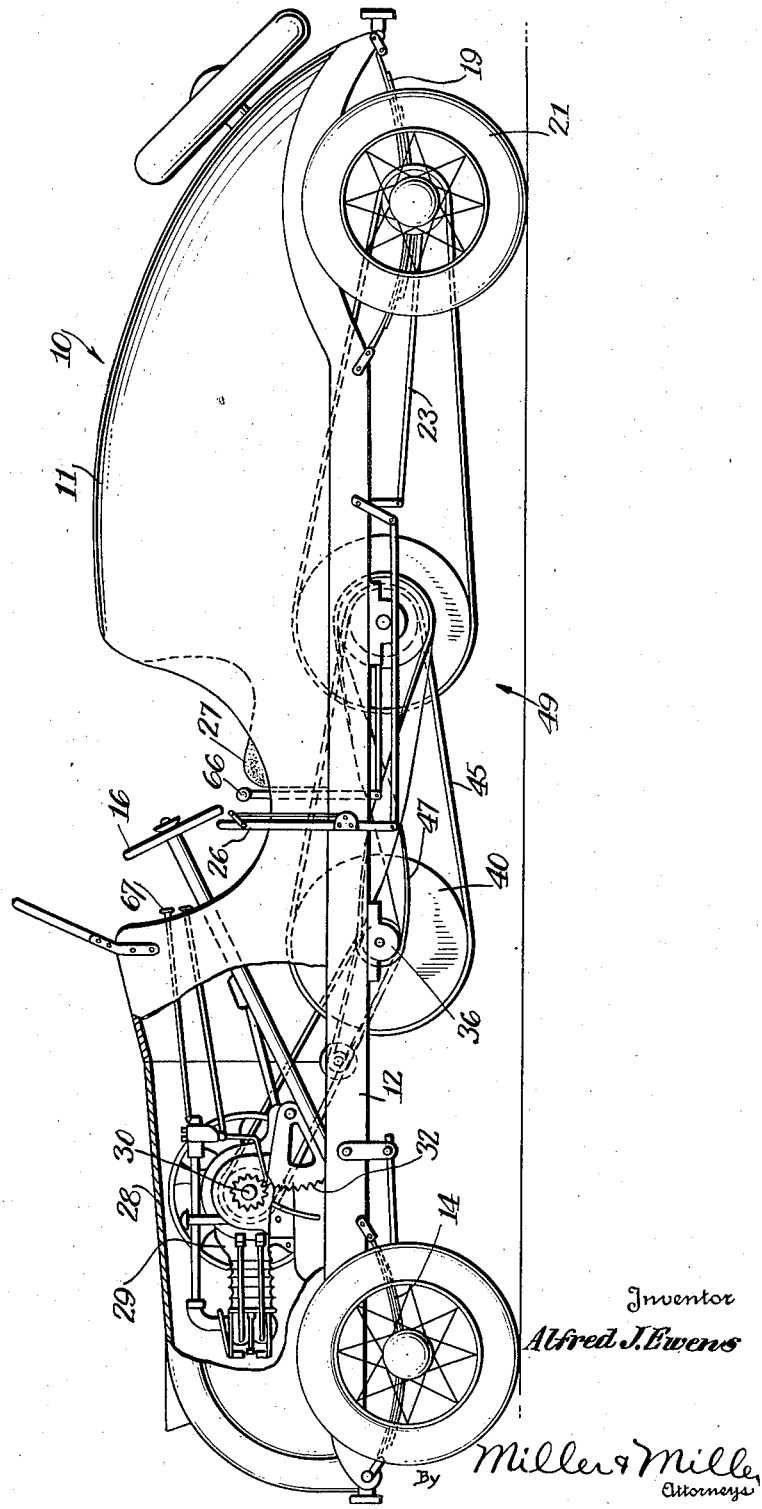

As shown at 10, the motor vehicle and body of this invention includes a light weight body shell 11 mounted on the chassis 12. The axle 13 is secured by springs 14 to the front end of the chassis and carries the front wheels 15 controlled in the conventional manner by the steering wheel 16 and steering wheel shaft 17. At the rear end, an axle housing 18 on springs 19 contains rear axle 20 for operating the rear wheels 21. The rear wheels 21 carry brakes 22 operated by brake rods 23 and a cross shaft 24 and a connecting rod 25 connected to a hand brake lever 26 located adjacent to the driver's seat 27.

Mounted under the hood 28 of the vehicle 10 is the motor 29. This motor 29 is preferably a light weight ¾ to a 3 horsepower, air-cooled gasoline motor. The motor 29 is provided with a motor shaft 30 at one end of which is a gear 31 meshing with the sector 32 for operation from a foot pedal 33 in order to start the motor. The motor shaft 30 carries a flywheel 34 and at its end is provided with a power take off pulley wheel 35.

Journaled in hangers 36 on the chassis 12 is a drive shaft 37 on which are keyed or fixed a plurality of pulley wheels 38, 39, 40 and 41. The pulley 38 is of substantially the same diameter as the pulley 35 on the motor shaft 30 and is connected thereto by an endless belt 42, this belt 42 as well as the remaining belts being preferably made of camel's hair belting.

The pulley 39 has a small endless belt 43 for operating a generator diagrammatically shown at 44 for supplying the necessary electrical current for lights and ignition, details of which may be conventional and hence are not shown hereon. The pulley 40 is of a much larger diameter than the pulley 38 and carries an endless belt 45 which rotates a loose pulley 46, the loose pulley 46 being of considerably smaller diameter than pulley 40. The pulley 41 is of substantially the same diameter as pulley 38 and carries an endless belt 47 trained over a loose pulley 48. It will be observed, however, that the endless belt 47 is twisted as at 49' and hence causes loose pulley 48 to rotate in an opposite direction to the loose pulley 46.

The clutch mechanism generally shown at 49 is provided for operatively connecting at will either the loose pulley 46 or the loose pulley 48 on the countershaft 50, the countershaft 50 being journaled in hangers 51 similar to the hangers 36 depending from the chassis 12. Keyed or fixed on this countershaft 50 is a large diameter pulley 52 carrying an endless belt 53 which operates a small diameter pulley 54 on the rear wheels axle 20 so as to keep the weight and expense of manufacturing to a minimum. Power is supplied to only one of the rear wheels by keying only one of the wheels to the axle and allowing the other of the wheels to rotate freely thereon, thus permitting each of the rear wheels to turn independently, or, if so desired the axle 20 may be a complete through axle, supplying the power equally to both wheels, inasmuch as the amount of slipping when turning corners will not be very serious due to the light weight of the entire vehicle. On the other hand, if desired, a differential can be provided between the pulley 54 and the axle 20, but this of course, will increase both the weight and expense.

Each of the two pulleys 46 and 48 has a clutch drum 55 secured thereto. Spiders 56 mounted on the countershaft 50 carry clutch shoes 57 within the brake drum 55. Pivotally secured to the spiders 56 are a pair of clutch shoe expanding fingers 58. Clutch fingers 58 of each clutch mechanism extend toward a common cam 59 shiftably mounted on the countershaft 50. This cam 59 is provided with a neck 60 into which extends a fork 61 on a shifting arm 62. This shifting arm 62 is secured by a set screw 63 to a shifting rod 64 which is mounted for transverse shifting movement in hangers 65 on chassis 12. Shifting rod 64 carries a shifting lever 66 convenient to the driver's seat 27.

As shown in Figure 3, the cam 59 has been placed in a neutral position where neither of the clutch fingers 58 are engaged therewith, thus permitting the motor 29 to be operated while the vehicle 10 remains stationary. To cause the vehicle 10 to travel forwardly, the brake lever 26 is operated to release the brakes 22 and then with the motor, having been started by the foot pedal 33, and its speed controlled by the throttle control 67, shifting lever 66 is slowly moved toward the right thus moving the cam 59 into engagement with the clutch fingers 58 of the clutch mechanism which will engage the loose pulley 46. As the clutch shoes 57 come into contact with the drum 55 on the loose pulley 46 thus being connected with the shaft 50, the pulley 52 operates pulley 54 on rear axle 20 to turn the rear wheels 21 to cause the car to travel forwardly, the speed being thereafter controlled by manipulation of the control 67 controlling the speed of the motor. As will be observed, the power passes from the belts 42, 45 and 53 to the rear wheels, the speed of rotation of the rear wheels is increased over the speed of the motor due to the relatively larger size of the pulley 40 over the pulley 46, and the pulley 52 over the pulley 54. If it is desired to stop the vehicle, shifting lever 66 is moved to the neutral position shown in Figure 3 and the hand brake 26 operated to stop the rotation of the rear wheels.

In order to cause the vehicle 10 to move backward, the hand brake is released and the shifting lever 66 is moved from the neutral position toward the left thus moving the cam 59 into engagement with the clutch fingers 58 of the clutch mechanism which will engage the loose pulley 48. The twisted belt 47 causes this loose pulley 48 to rotate in the opposite direction and thus transmits the power to the rear wheels to cause them to tram backwardly. Due to the relative size of the pulley transmitting power to the reverse operating pulley the car moves backwardly much more slowly than it would move forwardly with the same speed of operation of the motor.

The novel features and the operation of this device will be apparent from the foregoing description. While the device has been shown and the structure described in detail, it is obvious that this invention is not to be considered limited to the exact form disclosed and that changes may be made therein within the scope of what is claimed without departing from the spirit of the invention.

Having thus set forth and disclosed the nature of this invention, what is claimed is:

1. A light weight motor vehicle comprising a chassis frame having front and rear wheels thereon, a light weight motor mounted adjacent the front wheels on said chassis frame, said motor having a motor shaft, a power shaft and a countershaft each journaled in said chassis frame, a small diameter pulley wheel on said power shaft, an endless belt connecting said motor shaft to said small diameter pulley wheel to transmit power from said motor to said power shaft, a large diameter pulley wheel on said power shaft, a small diameter pulley wheel rotatably mounted on said countershaft, an endless belt connecting said last two mentioned pulley wheels for transmitting power to said countershaft in a forward direction to rotate said countershaft faster than said power shaft, a large diameter pulley wheel on said countershaft and a small diameter pulley wheel on the rear axle to the rear wheels, an endless belt carried by said last two mentioned pulley wheels, whereby the speed of rotation of the rear wheels relative to the motor shaft is multiplied, another small diameter pulley wheel on said power shaft and an intermediate diameter pulley wheel rotatably mounted on said countershaft, a twisted endless belt connecting said last two mentioned pulley wheels for transmitting power to said countershaft in a reverse direction to rotate said countershaft slower than said power shaft, a clutch mechanism on said countershaft between said two pulley wheels rotatably mounted thereon and a cam mechanism on said countershaft selectively engaging the clutch mechanism of either rotatably mounted pulley wheel to operate the countershaft and transmit power to the rear wheels.

2. A light weight motor vehicle comprising a chassis frame having front and rear wheels thereon, a light weight motor mounted adjacent the front wheels on said chassis frame, said motor having a motor shaft, a power shaft and a countershaft each journaled in said chassis frame, a small diameter pulley wheel on said power shaft, an endless belt connecting said motor shaft to said small diameter pulley wheel to transmit power from said motor to said power shaft, a large diameter pulley wheel on said power shaft, a small diameter pulley wheel rotatably mounted on said countershaft, an endless belt connecting said last two mentioned pulley wheels for transmitting power to said countershaft in a forward direction to rotate said countershaft faster than said power shaft, a large diameter pulley wheel on said countershaft and a small diameter pulley wheel on the rear axle to the rear wheels, an endless belt carried by said last two mentioned pulley wheels, whereby the speed of rotation of the rear wheels relative to the motor shaft is multiplied, another small diameter pulley wheel on said power shaft and an intermediate diameter pulley wheel rotatably mounted on said countershaft, a twisted endless belt connecting said last two mentioned pulley wheels for transmitting power to said countershaft in a reverse direction to rotate said countershaft slower than said power shaft, a clutch mechanism on said countershaft between said two pulley wheels rotatably mounted thereon, a cam mechanism on said countershaft selectively engaging the clutch mechanism of either rotatably mounted pulley wheel to operate the countershaft and transmit power to the rear wheels, said clutch mechanism including a clutch drum secured to each rotatably mounted pulley wheel, clutch shoes mounted on said countershaft and clutch shoe expanding fingers for engagement by said cam mechanism.

3. A light weight motor vehicle comprising a chassis frame having front and rear wheels thereon, a light weight motor mounted adjacent the front wheels on said chassis frame, said motor having a motor shaft, a power shaft and a countershaft each journaled in said chassis frame, a small diameter pulley wheel on said power shaft, an endless belt connecting said motor shaft to said small diameter pulley wheel to transmit power from said motor to said power shaft, a large diameter pulley wheel on said power shaft, a small diameter pulley wheel rotatably mounted on said countershaft, an endless belt connecting said last two mentioned pulley wheels for transmitting power to said countershaft in a forward direction to rotate said countershaft faster than said power shaft, a large diameter pulley wheel on said countershaft and a small diameter pulley wheel on the rear axle to the rear wheels, an endless belt carried by said last two mentioned pulley wheels, whereby the speed of rotation of the rear wheels relative to the motor shaft is multiplied, another small diameter pulley wheel on said power shaft and an intermediate diameter pulley wheel rotatably mounted on said countershaft, a twisted endless belt connecting said last two mentioned pulley wheels for transmitting power to said countershaft in a reverse direction to rotate said countershaft slower than said power shaft, a clutch mechanism on said countershaft between said two pulley wheels rotatably mounted thereon, a cam mechanism on said countershaft selectively engaging the clutch mechanism of either rotatably mounted pulley wheel to operate the countershaft and transmit power to the rear wheels, said clutch mechanism including a clutch drum secured to each rotatably mounted pulley wheel, clutch shoes mounted on said countershaft and clutch shoe expanding fingers for engagement by said cam mechanism, and means for operating said cam mechanism from the driver's seat comprising a cam shifting arm, a shifting rod on which said arm is secured, and a shifting lever mounted on said shifting rod adjacent the driver's seat.

ALFRED J. EWENS.